July 17, 1951 M. C. WILLIAMS 2,560,835
FISHING BAIT
Filed May 22, 1946
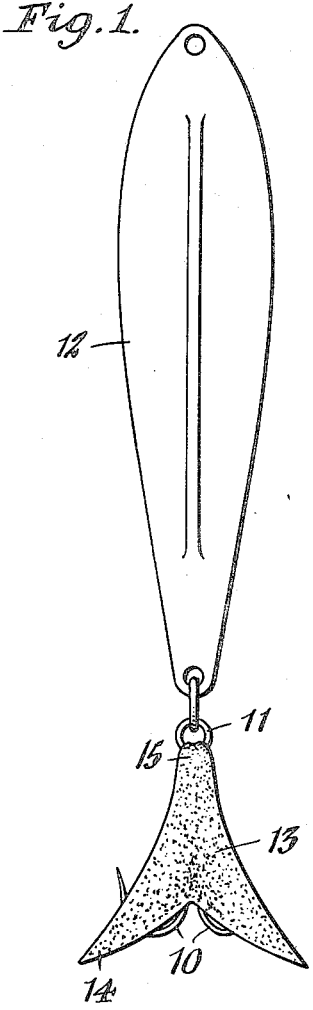
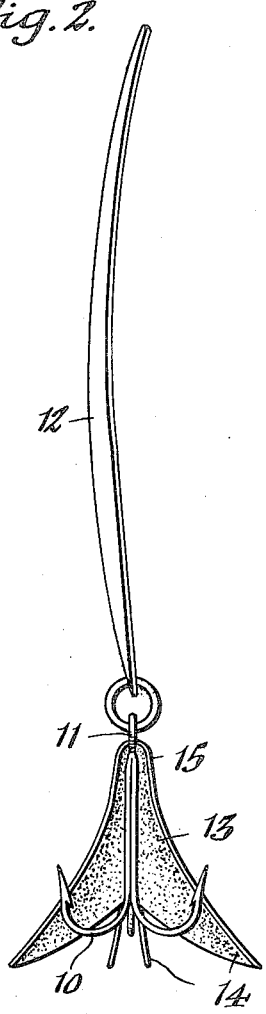
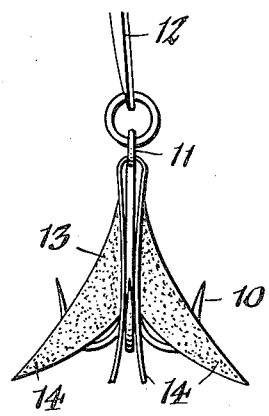
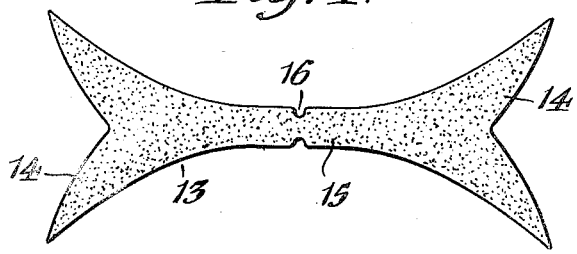
Inventor,
Malcom C. Williams,
by Walter P. Guyer
Attorney.

Patented July 17, 1951

2,560,835

UNITED STATES PATENT OFFICE 2,560,835

FISHING BAIT

Malcolm C. Williams, Fort Erie, Ontario, Canada

Application May 22, 1946, Serial No. 671,469

1 Claim. (Cl. 43—42.28)

This invention relates generally to certain new and useful improvements in fishing bait but more particularly to an imitation fish tail for attachment to a fish hook, artificial bait or lure.

It has for an object to provide an artificial bait device of this character which is so designed and constructed as to be readily attached to any eyed or ringed single, double or treble hook or to any type of lure without the removal of the hook therefrom.

Another object of the invention is to provide a fish tail like hook-engaging device which is made of a flexible material so as to give the artificial bait or lure a life-like or tail-fluttering action as it is drawn through the water.

A still further object is to provide an imitation fish tail for hooks and artificial bait which is simple and inexpensive in construction, which is easy to apply to and remove from the eye or ring of the hook, and which is so shaped as to embrace or conceal the hook and act as a deflector for guiding or directing the weeds away from the barbs of the hook to thereby render the hooks weedless.

Other features of the invention reside in the construction and arrangement of parts hereinafter described and particularly pointed out in the appended claim.

In the accompanying drawings: Figure 1 is a front view of the imitation fish tail device shown applied to a treble hook. Figure 2 is a side view thereof. Figure 3 is a similar fragmentary view, but looking from the opposite side. Figure 4 is a plan view of the device removed from the hook.

Similar characters of reference indicate corresponding parts throughout the several views.

By way of example, my invention has been shown in connection with a treble hook 10 having its eye 11 connected to a spoon or wobbler 12. The imitation fish tail constituting the invention is indicated generally by the numeral 13, being attached to the eye of the hook and pending freely and loosely therefrom along opposite sides of the shank of the hook and practically enshrouding or concealing the barbs thereof, so that when the line and its hook are pulled through the water this fish tail flutters and gives the artificial bait an animated action.

This fish tail element is made of rubber or like flexible material and so cut, shaped or molded as to be readily attached to the eye of the hook. In its preferred construction, this fish tail element is made from a single piece of sheet-like material cut to the form and shape shown in Figure 4, wherein the symmetrical diverging end portions 14 are of approximately fish tail or fin-like shape in plan while the intermediate neck or attaching portion 15 has parallel side edges. Formed in these side edges centrally of the attaching portion are notches 16, which in the applied position of the fish tail element, register with and engage the eye of the hook 10 to prevent the element from slipping or pulling off the hook.

The fish tail element may be readily applied to the eye of any hook or artificial bait or lure without removing the hook therefrom, and to so attach the element one end of its double tail is folded or rolled upon itself in a longitudinal direction and then inserted or threaded endwise through the eye of the hook until the notches 16 engage and interlock with such eye, after which the rolled end is allowed to unravel and folded downwardly to assume a pendant position opposite to that of the other half of the element, and in which position the hook is embraced or enclosed by the fish tail like ends of the element. In use, say in casting or trolling, this element is given a fluttering action as it is pulled through the water and the fin-like ends 14 thereof not only shroud the hook but also direct the weeds away from the hook-barbs.

While manifestly simple and inexpensive in construction, this device is easy to apply and remove and it effectually gives any artificial bait or lure a life-like action.

I claim as my invention:

In a detachable bait device of the character described, a symmetrically-shaped body blanked from a single piece of flexible sheet-like rubber material having a neck portion and diverging fish tail like end portions, the neck having notches in its opposite edges centrally of the body.

MALCOLM C. WILLIAMS.

REFERENCES CITED

The following references are of record in the file of this patent:

UNITED STATES PATENTS

| Number | Name | Date |
|---|---|---|
| 970,216 | Grove | Sept. 13, 1910 |
| 973,479 | Cooper | Oct. 25, 1910 |
| 981,454 | Miller et al. | Jan. 10, 1911 |
| 1,191,031 | Peters | July 11, 1916 |
| 1,707,407 | Miles | Apr. 2, 1929 |
| 1,821,585 | Smith | Sept. 1, 1931 |
| 2,191,244 | Wise | Feb. 20, 1940 |
| 2,332,400 | Richardson | Oct. 19, 1943 |

FOREIGN PATENTS

| Number | Country | Date |
|---|---|---|
| 454,804 | Great Britain | Oct. 8, 1936 |